(12) United States Patent
Anderson et al.

(10) Patent No.: US 6,186,511 B1
(45) Date of Patent: Feb. 13, 2001

(54) SEAL ASSEMBLY WITH AN INTERLOCKING LOAD RING

(75) Inventors: Michael D. Anderson; Aaron L. Smith, both of Franklin, NC (US)

(73) Assignee: Caterpillar Inc., Peoria, IL (US)

(*) Notice: Under 35 U.S.C. 154(b), the term of this patent shall be extended for 0 days.

(21) Appl. No.: 09/193,344

(22) Filed: Nov. 17, 1998

(51) Int. Cl.[7] .................................................. F16J 15/10
(52) U.S. Cl. ........................ 277/380; 277/270; 277/285; 277/275
(58) Field of Search .................................. 277/380, 370, 277/375, 385, 390, 396, 397

(56) References Cited

U.S. PATENT DOCUMENTS

| 3,272,519 | * | 9/1966 | Voitik | 277/380 |
|---|---|---|---|---|
| 3,542,377 | | 11/1970 | Voitik. | |
| 3,744,806 | * | 7/1973 | Keyser | 277/152 |
| 4,183,542 | | 1/1980 | Quartara. | |
| 5,527,046 | * | 6/1996 | Bedford | 277/92 |
| 5,553,931 | * | 9/1996 | Diekevers | 305/100 |

* cited by examiner

Primary Examiner—Anthony Knight
Assistant Examiner—Mark Williams
(74) Attorney, Agent, or Firm—William C. Perry; Calvin E. Glastetter

(57) ABSTRACT

A face seal assembly comprises a pair of confronting seal rings having mutually-engaging seal faces. The seal faces are maintained in sealing engagement by a pair of resilient load rings that are positioned between the seal rings and a pair of housings that are positioned on opposing sides of the seal rings. The load rings are received within a recess defined by the respective housings and are adapted to interfit with one another to thereby resist relative rotation therebetween.

18 Claims, 3 Drawing Sheets

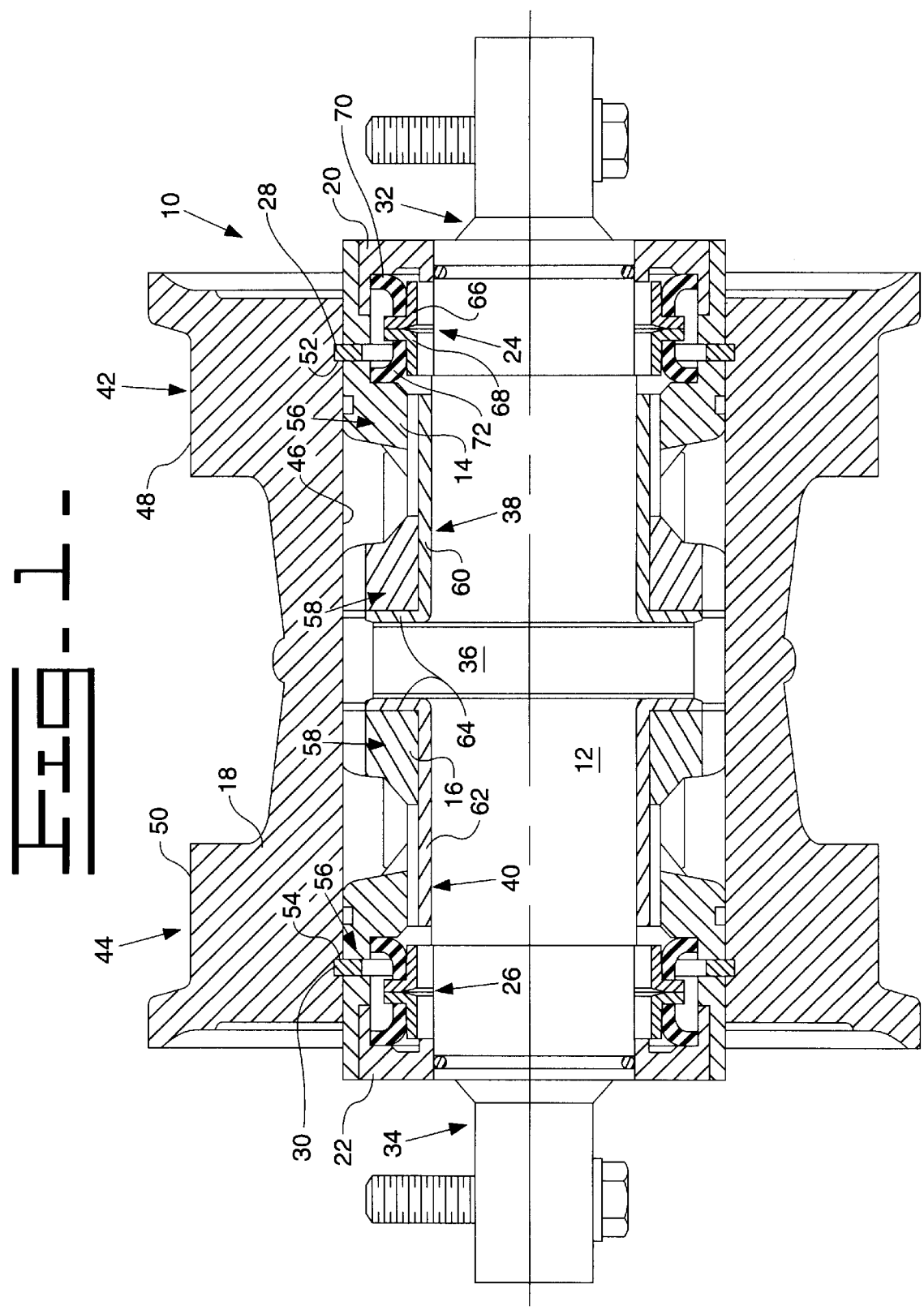

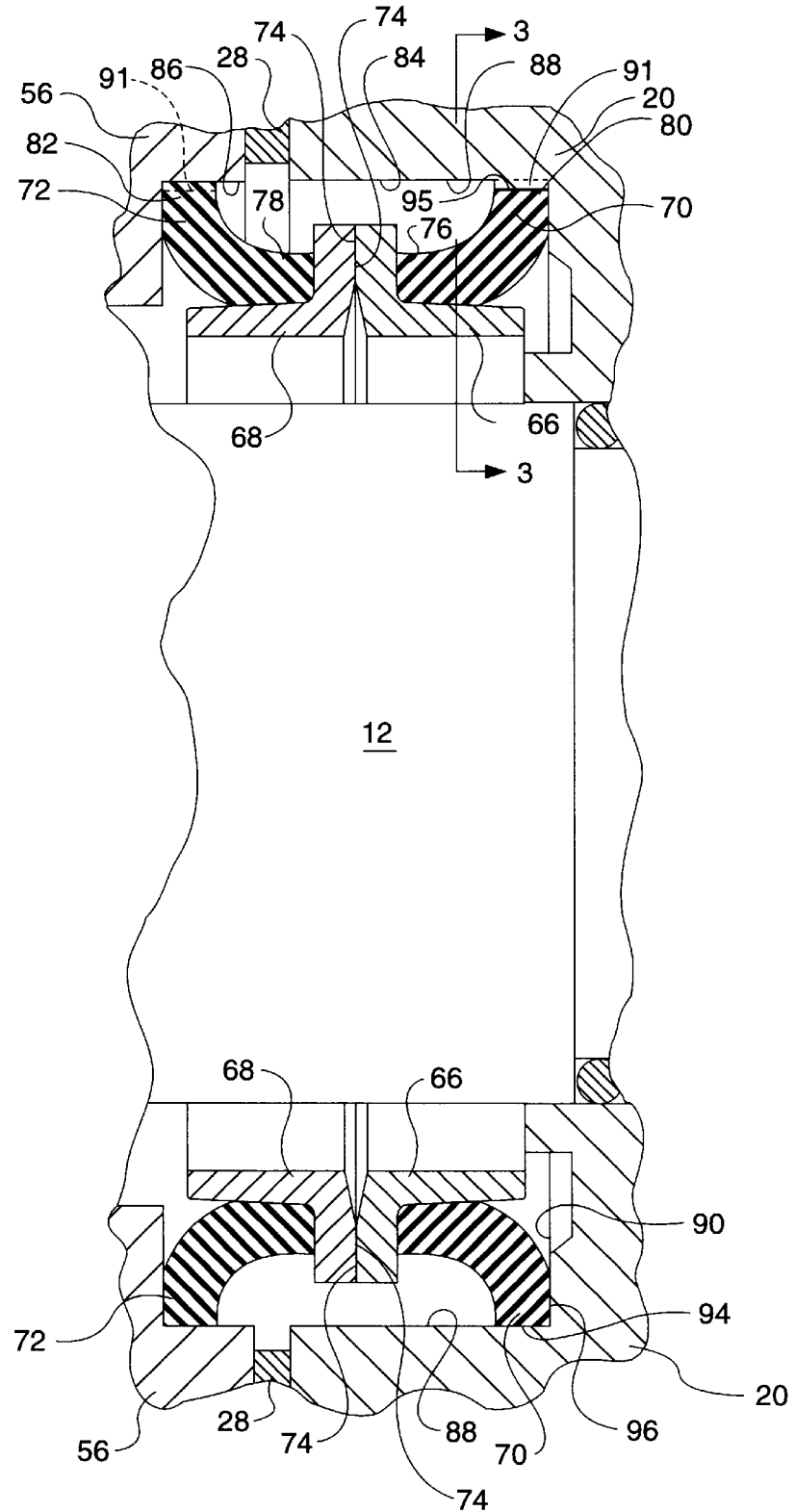

Fig_3.
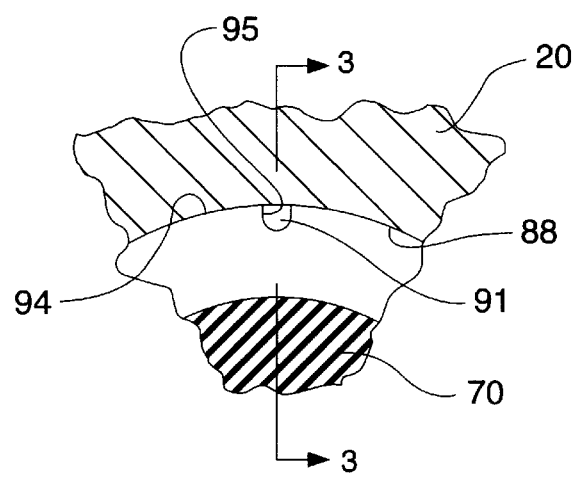
Fig_4.
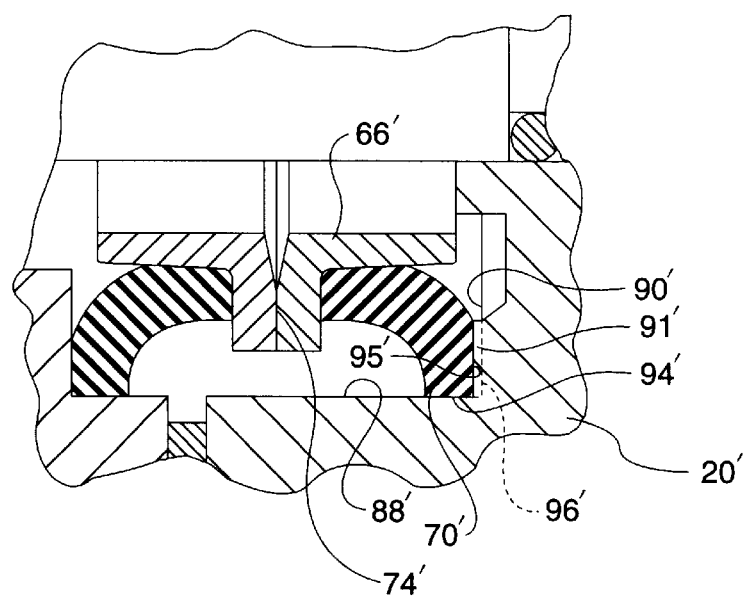

SEAL ASSEMBLY WITH AN INTERLOCKING LOAD RING

TECHNICAL FIELD

This invention relates generally to a metal-to-metal face seal assembly and more particularly to such a seal assembly having a load ring which interfits with a housing to prevent relative rotation therebetween.

BACKGROUND ART

Known face seal assemblies for use in constructions having relatively rotating components, such as track roller assemblies of tracked machines, final drives, etc., typically comprise a pair of confronting seal rings of metal or other durable, hard material. The seal rings rotate relative to one another, in face-to-face contact to provide a positive face seal, which retains lubricant and prevents foreign matter from reaching the internal bearing surfaces of the rotating assembly. Contact between the seal faces is maintained by a pair of resilient load rings that engage and press against each seal ring to thereby force the seal faces against one another. An example of such a seal assembly is described in commonly-owned U.S. Pat. No. 5,527,046, issued Jun. 18, 1996, to Billy R. Bedford.

Under certain conditions, the coefficient of friction between the seal faces may be higher than the coefficient of friction between a seal ring and its corresponding load ring, in which case relative rotation or slippage between one or both of the seal rings and its corresponding load ring may occur. Such slippage could occur, for example, if the faces of the confronting seal rings stick together due to icing or the like or if the engaging surfaces of the seal ring and load ring become lubricated. Slippage of the load ring relative to the seal ring results in a temporary loss of sealing protection, which can permit dirt and other abrasives to reach the internally lubricated bearings of the rotating assembly. In order to counter this problem, various designs have developed wherein there is a positive interconnection between load rings and the seal rings to resist the slippage at this interface. While this has been known to be a successful solution to the slippage problem between these two components, the slippage can then be transferred to the interface between the load rings and the respective housing. Once slippage has occurred in this region, leakage between the load ring and the housing is likely to occur.

This invention is directed to overcoming one or more of the problems that is set forth above.

DISCLOSURE OF THE INVENTION

In one aspect of the present invention a seal assembly is provided that has a first and second housing, each of which define a recess therein. A first and second seal ring, each having mutually confronting annular sealing faces is positioned between the first and second housings. First and second load rings, each having first and second end portions, are positioned with their respective first end portions engaged with opposing ones of the first and second seal rings and their respective second end portions engaged with opposing ones of the first and second housings. The load rings are adapted to urge the respective annular sealing faces of the respective seal rings into engagement with one another. A groove is defined in an outer periphery of the second end portion of at least one of the load rings and a rib is defined in the respective recess defined by at least one of the respective housings. The rib and the groove are adapted to engage one another to resist relative rotation therebetween.

In another aspect of the present invention a seal assembly is provided between first and second relatively rotating housings. A recess, having a first generally axially directed surface and a second generally radially directed surface extending from the first surface, is defined in each of the housings. A pair of seal rings, having mutually confronting annular seal faces, is adapted for positioning between the first and second housings. A pair of load rings are provided that have a first end portion adapted to engage opposing ones of the seal rings and a second end portion that is adapted to engage opposing ones of the housings. The load rings apply force to the seal rings to maintain the sealing engagement between the seal faces. Each load ring has an annular periphery that has a groove defined thereon and is adapted for positioning within the respective recesses. The grooves are positioned in interlocking engagement with the rib members defined by the recesses to resist relative movement therebetween.

With a seal assembly as set forth above, a positive interface between the load rings and the housing is provided to resist relative movement therebetween. In doing so, the potential for leakage at this interface is greatly reduced as is the chance for premature failure of the seal assembly.

BRIEF DESCRIPTION OF THE DRAWINGS

FIG. 1 is a diagrammatic, partially cross-sectional view of a track roller assembly incorporating a pair of seal assemblies in accordance with this invention;

FIG. 2 is an enlarged cross-sectional view of a portion of one of the seal assemblies illustrated in FIG. 1.

FIG. 3 is an enlarged cross-sectional view taken along lines 3—3 of FIG. 2; and

FIG. 4 is an enlarged view similar to that shown in FIG. 2, showing only a portion of the seal assembly and an alternate embodiment of the present invention.

BEST MODE FOR CARRYING OUT THE INVENTION

With reference to FIGS. 1 and 2, this invention is illustrated with respect to a track roller assembly, generally designated 10, for guiding the track (not shown) of a track-type machine (not shown). While this invention is shown for use in a track roller, it is to be understood that the invention may be used in other designs, such as final drive assemblies, wherein sealing is required between two relatively rotating components. The track roller assembly 10 includes a central supporting shaft 12, first and second bushings 14,16, a roller shell 18, first and second end caps 20,22, first and second seal assemblies 24,26, and first and second split metal retaining rings 28,30, which secure the roller shell 18 in a fixed position with respect to the bushings 14,16 and the shaft 12. The first and second end caps 20,22 are preferably press-fitted to the shaft 12 and the first and second bushings 14,16 are preferably press-fitted to the roller shell 18. The supporting shaft 12 has first and second end portions 32,34, a central flange portion 36, and first and second bushing supporting portions 38,40 which are positioned respectively between the central flange portion 36 and the first and second end portions 32,34. The first and second bushings 14,16 are positioned on respective first and second bushing supporting portions 38,40 of the supporting shaft 12.

The roller shell, 18 has first and second tread portions 42,44 and an internal through bore 46 with the supporting shaft 12 and bushings 14,16 being adapted to fit within the bore 46. The tread portions 42,44 have respective contact surfaces 48,50 which are adapted to contact the endless track (not shown) of the track-type machine (not shown).

The first and second end caps 20,22 are positioned on respective first and second shaft end portions 32,34 and substantially close off each end of the internal bore 46. The first and second seal assemblies 24,26 are positioned between respective first and second bushings 14,16 and first and second end caps 20,22. The seal assemblies 24,26 prevent leakage of lubricating fluid out of the internal bore 46 and prevent dirt and other foreign material from entering the internal bore 46.

The track roller shell 18 has first and second circular grooves 52,54 formed in the internal bore 46 and the split retaining rings 28,30 are adapted to fit within respective grooves 52,54. Each of the bushings 14,16 has first and second end portions 56,58 with the first end portions 56 being adapted to contact one of the split rings 28,30 and the second end portions 58 being adapted to contact the central flange portion 36 of the supporting shaft 12. The track roller assembly 10 further includes first and second bearing sleeves 60,62, with each sleeve 60,62 having a radially extending flange portion 64. The bearing sleeves 60,62 are positioned between the respective first and second bushing supporting portions 38,40 and the first and second bushings 14,16. The flange portion 64 of each sleeve 60,62 is positioned between the central flange portion 36 of the shaft 12 and the second end portion 58 of one of the bushings 14,16.

Each of the seal assemblies 24,26 includes first and second metal seal rings 66,68 and first and second resilient load rings 70,72. The seal rings 66,68 are substantially similar with each seal ring 66,68 having a seal face 74 which mates with a like seal face 74 on a mating seal ring 66,68 in the assembled condition of the seal assembly 24,26. The resilient load rings 70,72 are also substantially similar and are adapted to apply a force to the seal rings 66,68 and the seal faces 74. Each of the resilient load rings 70,72 is cup-shaped, is columnar in cross-section, and is configured similar to the load rings described in the aforementioned 5,527,046 patent. The manner in which the seal faces 74 are maintained in sealing engagement by the load rings 70, 72 is well known in the art and is not described further herein.

Referring to FIG. 2, it can be seen that each of the load rings 70, 72 has a first end portion 76,78 that engages the respective seal rings 66,68 on a side thereof in direct opposition to the seal faces 74. The load rings have second end portions 80,82 that engage the respective recesses 84,86 defined in the respective end cap 20 and the first end portion 56 of bushing 14. For purposes of clarity, only recess 84 will be described in detail, it being understood that the recesses in the other end cap 22 and both bushings 14 and 16 may be identical in configuration.

Recess 84 defines a first surface 88 that extends generally in an axial direction. A second surface 90 extends from the first surface 88 in a generally radial direction. A rib member 91 is defined on the first surface 88 and extends in an axial direction. The second end portion 80 of the load ring 70 is shown to define a first surface 94 that is positioned to engage the first surface 88 of the recess. A groove 95 is defined in the periphery of the first surface and also extends in an axial direction. A second surface 96 of the second end portion 80 is shown to engage the second surface 90 defined by the recess 84. In the illustrated embodiment shown in FIG. 3, it can be seen that the rib 91 is received within the groove 95 when the load ring is installed within the recess.

Referring to FIG. 4, it can be seen that a rib member 91' is defined on the second surface 90' defined by the recess 84'. Likewise, the groove 95' is defined on the second surface 96' to extend in the same direction as that of the rib member. The rib member 91' is received within the groove 95' to interlock the position of the load ring 70' with respect to the recess 84'.

While the present invention is described and shown with a single rib member positioned in the recess and a single groove formed in the load ring, it is to be understood that a plurality of ribs and grooves may be formed in the respective components without departing from the intent of the present invention. Also, it is to be understood that the groove and the rib member may be interchangeably positioned in either the recess or the load ring. While not specifically shown, the groove may be defined by the either or both surfaces of the recess and the groove may be defined in either or both of the surfaces of the load ring.

Industrial Applicability

In use, the seal assemblies 24, 26 described above are useful in increasing the life of the roller assembly 10 because a positive seal between the seal faces 74 can be maintained. The interfitting relationship between the load rings 70,72 and the respective housings 22,56 with which they are engaged, resists rotation and slippage therebetween. This relationship will be maintained even when the coefficient of friction between the seal faces 74 is greater than the normal coefficient of friction between the load rings and their respective housings. Because the load rings 70,72 resist slippage, there is less likelihood of seal failure.

Although the presently preferred embodiments of this invention have been described, it will be understood that within the purview of the invention various changes may be made within the scope of the following claims. For example, although the invention is illustrated in detail with respect to a track roller assembly, one skilled in the art will readily recognize that a seal assembly in accordance with the instant invention is equally useful in a final drive assembly or any other rotating assembly.

Other aspects, objects and advantages of this invention can be obtained from a study of the drawings, the disclosure and the appended claims.

What is claimed is:

1. A seal assembly, comprising:
   a first housing having a recess defined therein;
   a second housing having a recess defined therein;
   first and second seal rings having mutually confronting annular sealing faces positioned between said first and second housings;
   first and second load rings each having first and second end portions, said load rings being positioned with their respective first end portions engaged with opposing ones of the first and second seal rings and their respective second end portions engaged with opposing ones of the first and second housings, said load rings being adapted to urge the respective annular sealing faces of the respective seal rings into engagement with one another;
   a groove defined in an outer periphery of the second end portions of at least one of said load rings; and
   a rib member defined by the recess of at least one housing, said rib member being adapted for engagement with the groove defined by the load rings to resist relative rotation therebetween.

2. The seal assembly as set forth in claim 1 wherein the first housing is a stationary housing and the second housing is mounted for rotation with respect to the first housing.

3. The seal assembly as set forth in claim 2 wherein the second seal ring and the second load ring rotate with the second housing relative to the first seal ring and first load ring.

4. The seal assembly as set forth in claim 1 wherein said at least one recess defines a first, generally axially directed surface and a second, generally radially directed surface.

5. The seal assembly as set forth in claim 4 wherein the second end portion of said at least one of the load rings defines a first surface that is adapted for engagement with the first surface of said recess and a second surface that is adapted for engagement with the second surface of the recess.

6. The seal assembly as set forth in claim 5 wherein the rib member is defined in the first surface of said recess and engages a groove defined in the first surface defined by the second end portion of the load ring.

7. The seal assembly as set forth in claim 5 wherein the rib member is defined in the second surface of said recess and engages a groove defined in the second surface defined by the second end portion of the load ring.

8. The seal assembly as set forth in claim 1 wherein the recess defined by the first and second housings has a rib defined therein and the second end portions of the first and second load rings define grooves therein, said load rings being adapted for positioning within the respective recesses with the grooves thereof engaged with the respective rib members to resist relative rotation therebetween.

9. The seal assembly as set forth in claim 1 wherein a plurality of grooves is defined in the outer periphery of the second end portion of said load ring, said grooves being engageable with a plurality of rib members defined in said recess.

10. A seal assembly, comprising:

a first housing;

a second housing positioned adjacent the first housing and mounted for relative rotation with respect thereto about an axis;

a pair of recesses, each having a first, generally axially directed surface having a rib member defined thereon and a second, generally radially directed surface extending from the first surface, said recesses being defined in opposing ones of the first and second housings;

a pair of seal rings having mutually confronting annular seal faces adapted for positioning between the first and second housings;

first and second load rings each having a first end portion adapted to engage an opposing one of the first and second seal rings and a second end portion adapted to engage an opposing one of the first and second housings to apply force to the seal rings to thereby maintain said seal faces in sealing engagement, each load ring having an annular periphery having a groove defined thereon and being adapted for positioning within the respective recesses with the grooves thereof in interlocking engagement with the rib member defined by the recesses to resist relative rotation therebetween.

11. The seal assembly as set forth in claim 10 wherein the load rings define a first, generally axially directed surface and a second, generally radially directed surface extending from the first surface, and said grooves being defined in a periphery of the first surface, said load rings being adapted for positioning within the recesses with the rib members received in the grooves defined by the load rings.

12. The seal assembly as set forth in claim 11 wherein the rib members are positioned on the second surface of the recesses and the grooves are defined in the second surface of the load rings.

13. The seal assembly as set forth in claim 10 wherein a plurality of rib members are defined in the recesses and a plurality of grooves are defined in the periphery of the load rings, said load rings being positioned to interlockingly engage the plurality of rib members.

14. A seal assembly, comprising:

a first housing;

a second housing positioned adjacent the first housing and mounted for relative rotation with respect thereto about an axis;

a pair of recesses having a pair of surfaces defined therein, said recesses being defined in opposing ones of the first and second housings;

a pair of seal rings having mutually confronting annular seal faces adapted for positioning between the first and second housings;

first and second load rings each having a first end portion adapted to engage an opposing one of the first and second seal rings and a second end portion adapted to engage an opposing one of the first and second housings to apply force to the seal rings to thereby maintain said seal faces in sealing engagement;

a rib member defined in one of the recesses and load rings; and a groove defined in the other of the recesses or load rings and being adapted for interfitting engagement with the rib member to resist relative movement between the recess and the load ring.

15. The seal assembly as set forth in claim 14 wherein each recess is defined by a first, generally axially extending surface and a second, generally radially extending surface.

16. The seal assembly as set forth in claim 15 wherein one of the groove and rib member is defined in one of the first and second surfaces defined by the recesses.

17. The seal assembly as set forth in claim 15 wherein each load ring has an annular periphery defined by a first, generally axially directed surface and a second, generally radially directed surface, said load ring being adapted for positioning within the respective recesses with the respective first and second surfaces of the load ring engaged with the first and second surfaces of the recess.

18. The seal assembly as set forth in claim 17 wherein one of the groove and the rib member is defined in one of the first and second surfaces of the load ring.

* * * * *